(12) United States Patent
Hausl et al.

(10) Patent No.: US 12,501,294 B2
(45) Date of Patent: Dec. 16, 2025

(54) RADIO FREQUENCY SCANNER SYSTEM AND METHOD FOR MOBILE NETWORK TESTING

(71) Applicant: Rohde & Schwarz GmbH & Co. KG, Munich (DE)

(72) Inventors: Christoph Hausl, Munich (DE); Joshua Funk, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 777 days.

(21) Appl. No.: 17/929,227

(22) Filed: Sep. 1, 2022

(65) Prior Publication Data

US 2023/0071075 A1 Mar. 9, 2023

(30) Foreign Application Priority Data

Sep. 3, 2021 (EP) .................................... 21194797
May 30, 2022 (EP) .................................... 22176117

(51) Int. Cl.
*H04W 24/08* (2009.01)
*G01S 19/01* (2010.01)
(Continued)

(52) U.S. Cl.
CPC ............. *H04W 24/08* (2013.01); *G01S 19/01* (2013.01); *G01S 19/42* (2013.01); *H04W 56/001* (2013.01); *H04W 72/046* (2013.01)

(58) Field of Classification Search
CPC . H04W 24/08; H04W 56/001; H04W 72/046; G01S 19/01; G01S 19/42
See application file for complete search history.

(56) References Cited

U.S. PATENT DOCUMENTS

2001/0003443 A1* 6/2001 Velazquez ............. H04W 16/28
455/562.1
2007/0073482 A1 3/2007 Churchill et al.
(Continued)

FOREIGN PATENT DOCUMENTS

EP 2589983 A1 5/2013
WO 01/58195 A1 8/2001

OTHER PUBLICATIONS

Cidronali, A. et al., "Analysis and Performance of a Smart Antenna for 2.45-GHz Single-Anchor Indoor Positioning," IEEE Transactions on Microwave Theory and Techniques, vol. 58, No. 1, Jan. 2010, pp. 21-31.

*Primary Examiner* — Rafael Pérez-Gutiérrez
*Assistant Examiner* — Gilbert M. Grant
(74) *Attorney, Agent, or Firm* — CHRISTENSEN O'CONNOR JOHNSON KINDNESS PLLC

(57) ABSTRACT

A radio frequency scanner system for mobile network testing includes at least one switchable directional antenna assembly, a radio frequency receiver, and a processing circuit. The antenna assembly includes several directional antennas oriented in different directions. The radio frequency receiver is configured to process the radio frequency signal received by the antenna assembly, thereby converting the at least one radio frequency signal to a baseband signal. The processing circuit is configured to process at least two baseband signals associated with two different directional antennas in order to determine an angle of arrival (AoA) of the at least one radio frequency signal with respect to the at least one antenna assembly. The processing circuit is configured to estimate a geographic location of a base station emitting the at least one radio frequency signal based on the angle of arrival of the at least one radio frequency signal.

16 Claims, 6 Drawing Sheets

- selecting, by means of a switch, a first of several directional antennas of a switchable directional antenna assembly,

- receiving a radio frequency signal by means of the first directional antenna of the switchable directional antenna assembly,

- processing the radio frequency signal by means of a radio frequency receiver, thereby converting the radio frequency signal to a first baseband signal associated with the first directional antenna,

- selecting, by means of the switch, a second of the several directional antennas of the switchable directional antenna assembly,

- receiving the radio frequency signal by means of the second directional antenna of the switchable directional antenna assembly,

- processing the radio frequency signal by means of the radio frequency receiver, thereby converting the radio frequency signal to a second baseband signal associated with the second directional antenna,

- forwarding the first baseband signal and the second baseband signal to a processing circuit,

- processing, by means of the processing circuit, the first baseband signal and the second baseband signal, which are associated with the first directional antenna and the second directional antenna, in order to determine an angle of arrival of the at least one radio frequency signal with respect to the at least one switchable directional antenna assembly, and

- estimating, by means of the processing circuit, a geographic location of a base station emitting the at least one radio frequency signal based on the angle of arrival of the at least one radio frequency signal as well as optionally the receive power, the time of arrival and/or a Doppler shift.

(51) Int. Cl.
  *G01S 19/42*    (2010.01)
  *H04W 56/00*   (2009.01)
  *H04W 72/044*  (2023.01)

(56) References Cited

U.S. PATENT DOCUMENTS

2014/0327579 A1    11/2014  Hart et al.
2018/0213355 A1     7/2018  Smith et al.
2021/0011109 A1*    1/2021  Gibbons .................. G01S 5/12

* cited by examiner

Switched directional antenna assembly

Fig. 6

- selecting, by means of a switch, a first of several directional antennas of a switchable directional antenne assembly,

- receiving a radio frequency signal by means of the first directional antenna of the switchable directional antenna assembly,

- processing the radio frequency signal by means of a radio frequency receiver, thereby converting the radio frequency signal to a first baseband signal associated with the first directional antenna,

- selecting, by means of the switch, a second of the several directional antennas of the switchable directional antenna assembly,

- receiving the radio frequency signal by means of the second directional antenna of the switchable directional antenna assembly,

- processing the radio frequency signal by means of the radio frequency receiver, thereby converting the radio frequency signal to a second baseband signal associated with the second directional antenna,

- forwarding the first baseband signal and the second baseband signal to a processing circuit,

- processing, by means of the processing circuit, the first baseband signal and the second baseband signal, which are associated with the first directional antenna and the second directional antenna, in order to determine an angle of arrival of the at least one radio frequency signal with respect to the at least one switchable directional antenna assembly, and

- estimating, by means of the processing circuit, a geographic location of a base station emitting the at least one radio frequency signal based on the angle of arrival of the at least one radio frequency signal as well as optionally the receive power, the time of arrival and/or a Doppler shift.

RADIO FREQUENCY SCANNER SYSTEM AND METHOD FOR MOBILE NETWORK TESTING

FIELD OF THE DISCLOSURE

Embodiments of the present disclosure relate to a radio frequency (RF) scanner system for mobile network testing. Further, embodiments of the present disclosure relate to a method of mobile network testing by using a scanner system.

BACKGROUND

In the state of the art, scanner systems for mobile network testing are known that are inter alia used for interference hunting in order to identify a source of interfering signals in a mobile network or for determining the performance of a mobile network. Accordingly, the network testing can be used in order to identify the coverage of a certain mobile network by analyzing the radio frequency signals emitted from base stations in a certain area, namely a scanning area.

Typically, the scanner systems comprise at least one radio frequency measurement device that measures the respective radio frequency signals received, wherein the radio frequency signals received are processed and forwarded to a separate analyzing and/or evaluation device for analyzing or rather evaluation purposes.

According to an industry-standard method used for mobile network scanning, omnidirectional antennas are used for receiving radio frequency signals to be analyzed from the entire environment in order to characterize the respective mobile network. Omnidirectional antennas can be used for receiving signals in a frequency range associated with 5G FR1, namely signals in a frequency range that includes sub-6 GHz frequency bands in LTE.

However, mobile network testing for millimeter waves, namely signals in a frequency range associated with 5G FR2, causes problems when using the industry-standard method. So far, the respective measurement for millimeter waves has to be done by a phased antenna array, which however is an expensive solution since dedicated control unit and phase shifters are required that also have an influence on the overall accuracy.

Accordingly, there is a need for a radio frequency scanner system as well as a method which ensure to perform mobile network testing in a cost-efficient and accurate manner, particularly of mobile networks using frequency ranges associated with 5G FR2.

SUMMARY

Embodiments of the present disclosure provide a radio frequency (RF) scanner system for mobile network testing. In an embodiment, the scanner system comprises at least one switchable directional antenna assembly, a radio frequency receiver, and a processing circuit. The at least one switchable directional antenna assembly comprises several directional antennas oriented in different directions. The directional antennas of the at least one switchable directional antenna assembly are connected to at least one switch that is controlled by the radio frequency receiver and/or the processing circuit. The directional antennas are configured to receive at least one radio frequency signal. The radio frequency receiver is connected with the switchable directional antenna assembly. The radio frequency receiver is configured to process the at least one radio frequency signal received by the switchable directional antenna assembly, thereby converting the at least one radio frequency signal to a baseband signal. The processing circuit is configured to process at least two baseband signals associated with two different directional antennas in order to determine an angle of arrival (AoA) of the at least one radio frequency signal with respect to the at least one switchable directional antenna assembly. The processing circuit is configured to estimate a geographic location of a base station emitting the at least one radio frequency signal based on the angle of arrival of the at least one radio frequency signal.

Further, embodiments of the present disclosure provide a method of mobile network testing by using a scanner system. In an embodiment, the method comprises the steps of: selecting, by a switch, a first of several directional antennas of a switchable directional antenna assembly, receiving a radio frequency signal by the first directional antenna of the switchable directional antenna assembly, processing the radio frequency signal by a radio frequency receiver, thereby converting the radio frequency signal to a first baseband signal associated with the first directional antenna, selecting, by the switch, a second of the several directional antennas of the switchable directional antenna assembly, receiving the radio frequency signal by the second directional antenna of the switchable directional antenna assembly, processing the radio frequency signal by the radio frequency receiver, thereby converting the radio frequency signal to a second baseband signal associated with the second directional antenna, forwarding the first baseband signal and the second baseband signal to a processing circuit, processing, by the processing circuit, the first baseband signal and the second baseband signal, which are associated with the first directional antenna and the second directional antenna, in order to determine an angle of arrival of the at least one radio frequency signal with respect to the at least one switchable directional antenna assembly, and estimating, by the processing circuit, a geographic location of a base station emitting the at least one radio frequency signal based on the angle of arrival of the at least one radio frequency signal.

The main idea is based on the finding that a switchable directional antenna assembly with several directional antennas, also called a switched directional antenna assembly, is used in order to achieve wide bandwidth scanning in a cost-efficient way while simultaneously having a small form factor. The switchable directional antenna assembly, for example its individual directional antennas, is used for performing angle of arrival measurement such that an impinging direction of the radio frequency signal with respect to the switchable directional antenna assembly is determined. This information is used to estimate the geographic location of the base station that emits the at least one radio frequency signal.

For the angle of arrival measurement, at least two different directional antennas of the directional antenna assembly are selected which provide respective signals. These signals are analyzed by the processing circuit in order to determine the angle of arrival of the radio frequency signal with respect to the switchable directional antenna assembly. The signals captured by the different directional antennas are converted to respective baseband signals by the radio frequency receiver, which are processed further by the processing circuit in order to, inter alia, determine the angle of arrival based on which the location estimation takes place. The switch may be controlled to switch from the first directional antenna to the second directional antenna such that two different baseband signals are provided which are associated with the different directional antennas, namely the first directional antenna and the second directional antenna.

Generally, the angle of arrival measurement ensures that accurate estimations of the location of the base station can be provided.

In some embodiments, the processing circuit may process the baseband signals being indicative of the radio frequency signal received by the dedicated directional antenna selected.

The respective processing by the processing circuit may take place afterwards, namely after gathering the baseband signals or the data associated therewith by the radio frequency receiver. Hence, the baseband signal or data associated with the baseband signals may be gathered by the radio frequency receiver that is connected later to the processing circuit in order to forward the data to the processing circuit for analyzing the data gathered, thereby determining the angle of arrival used for estimating the location of the base station.

In some embodiments, the switchable directional antenna assembly may comprise N directional antennas, wherein N is any positive natural number, e.g. an even or rather uneven number.

Generally, each directional antenna of the switchable directional antenna assembly is oriented in a different direction with respect to the other directional antennas. Hence, each of the directional antennas is orientated differently with respect to the other directional antennas. Put differently, N directional antennas may be provided that are oriented in N different directions.

Therefore, the beam width of the switchable directional antenna assembly may be adapted depending on the number of directional antennas used simultaneously during a respective measurement, as they are oriented in different directions.

Accordingly, an antenna array with several non-directional antennas can be avoided. Consequently, phase shifters necessary when using such antenna arrays can be avoided as well, thereby reducing the costs significantly. In addition, it is ensured that a bandwidth limitation does not occur, which is typically introduced by the phase shifters. Moreover, attenuation effects introduced by the phase shifters are also avoided, thereby improving the accuracy of the radio frequency scanner system.

Generally, a directional antenna, also called beam antenna, is an antenna which radiates or receives higher power in specific directions allowing increased performance and reduced interference from unwanted sources. In some embodiments, the use of directional antennas provides increased performance over dipole antennas—or omnidirectional antennas in general—when higher concentration of radiation in a certain direction is desired. Since the switchable directional antenna assembly comprises several directional antennas oriented in different directions, increased performance is ensured, but omnidirectional scanning is enabled, e.g. at least in a subsequent manner.

In some embodiments, only a single or a defined number of directional antennas of the switched directional antenna assembly, namely a subset of all directional antennas, may be turned/switched on simultaneously, thereby contributing to the signal that is processed by the radio frequency receiver in order to generate the respective baseband signal. However, the first directional antenna and the second directional antenna are different directional antennas.

In case of subsets of directional antennas used for the respective measurement, the respective subsets differ from each other, for example the respective subsets differ in the first directional antenna and the second directional antenna. This means that the first angle of arrival measurement may be performed by a first subset of directional antennas that includes the first directional antenna and for instance three further directional antennas, whereas the second angle of arrival measurement may be performed by a second subset of directional antennas that includes the same three further directional antennas, but the second directional antenna instead of the first directional antenna.

The baseband signal is based on the individual signal(s) received at each of the directional antenna(s) of the switchable directional antenna assembly, which is/are turned on during the respective angle of arrival measurement. In other words, the respective individual directional antenna(s) turned on contribute(s) to the baseband signal.

Moreover, the radio frequency receiver or the processing circuit may control the switch in order to select the respective directional antenna of the switchable directional antenna assembly.

In addition to the data gathered, namely the baseband signals, the processing circuit and/or the radio frequency receiver may also take information of a switching state of the switch into account. This additional information is used for determining the angle of arrival, as information is obtained which of the several directional antennas has been used for obtaining the data associated with the respective baseband signal. In some embodiments, the radio frequency receiver is configured to record the information of the switching state of the switch, wherein the respective information is forwarded to the processing circuit.

As mentioned above, the switching state of the switch is indicative of the respective directional antenna of the several directional antennas of the switchable directional antenna assembly, which is used for mobile network testing. In other words, the information is gathered which of the several directional antennas has been selected or rather switched/turned on when performing the respective measurement by the switchable directional antenna assembly.

In some embodiments, the scanner system is configured to capture radio frequency signals like synchronization signals which are periodically transmitted by base stations.

Furthermore, the scanner system is configured to perform angle of arrival measurement at different measurement locations, thereby obtaining more data. Accordingly, the scanner system, for example the processing circuit, is enabled to process the data associated with the different measurement locations, e.g. the different angles of arrival determined at the different measurement locations, in order to estimate the geographic location of the base station in a more accurate manner.

In some embodiments, the baseband signal is a digital baseband signal and/or comprises in-phase and quadrature components, namely in-phase and quadrature (I/Q) data. The radio frequency receiver may process an analog signal received by the switchable directional antenna assembly, namely the radio frequency signal received by the respective selected directional antenna. The respective signal may be digitized by the radio frequency receiver in order to obtain the digital baseband signal. Moreover, the radio frequency receiver may process the respective signal received by the directional antenna selected such that I/Q components are obtained that are indicative of the radio frequency signal captured by the respective directional antenna.

In some embodiments, the processing circuit is configured to process information of a switching state of the switch when determining the angle of arrival of the at least one radio frequency signal. The relative position and/or orientation of the different directional antennas of the switchable directional antenna assembly may be known to the processing circuit, wherein each of the directional antennas has a antenna index that is indicative of the respective directional antenna in an unambiguous manner. Accordingly, the processing circuit obtains the information concerning the directional antenna selected that contributes to the baseband signal that is processed by the processing circuit. Thus, the processing circuit is enabled to put the respective baseband signals derived from the different directional antennas in relation to each other, thereby taking position and/or orientation relationships of the different directional antennas into account in order to determine the angle of arrival of the radio frequency signal.

In some embodiments, no further information may be necessary for determining the angle of arrival in case the switchable directional antenna assembly is a stationary one that is placed at a certain location, thereby ensuring that the relative orientation and/or position of the directional antennas with respect to each other do not alter during the measurement.

In some embodiments, geometrical relationships and/or mechanical connections of the respective directional antennas with respect to each other are known to the processing circuit. Accordingly, the processing circuit is enabled to determine the respective bearing/orientation of the individual directional antennas.

Generally, the bearing/orientation can be determined for each component of the radio frequency scanner system, as the respective geometrical relationships and/or mechanical connections of these components are known.

In some embodiments, the radio frequency scanner system comprises a positioning antenna assembly configured to receive a global navigation satellite system (GNSS) signal. The positioning antenna assembly is located in defined relation with respect to the switchable directional antenna assembly. The processing circuit is configured to receive and process the GNSS signal from the positioning antenna assembly, which is indicative of the position and/or bearing of a switchable directional antenna assembly such that the processing circuit is configured to gather information of the position and/or the bearing of the switchable directional antenna assembly.

In some embodiments, the radio frequency scanner system additionally comprises the positioning antenna assembly that may be associated with the switchable directional antenna assembly. Accordingly, the positioning antenna assembly can be used to determine the relative orientation and/or position of the switchable directional antenna assembly, thereby obtaining information concerning the actual bearing and/or position of the switchable directional antenna assembly. This information can be used in addition to the information obtained from the individual directional antennas of the switchable directional antenna assembly, namely the baseband signals, in order to determine the angle of arrival of the at least one radio frequency signal.

In some embodiments, the additional positioning antenna assembly may be used provided that the radio frequency scanner system is a mobile scanner system or rather comprises a mobile scanner system portion that can be moved during the respective measurement. This ensures that the actual position and/or orientation of the switchable directional antenna assembly is recorded simultaneously, which may alter during the measurement. Accordingly, a different position/orientation of the switchable directional antenna assembly does not have any negative influence on the measurement accuracy.

Accordingly, based on the information obtained from the GNSS signal, the respective bearing/orientation of the switchable directional antenna assembly, for example the respective bearing/orientation of each individual directional antenna, can be determined, e.g. by taking the geometrical relationships and/or mechanical connections of the respective antenna assemblies with respect to each other into account.

In some embodiments, the geometrical relationships and/or mechanical connections of the respective antenna assemblies, namely the positioning antenna assembly and the switched directional antenna assembly, are known such that the bearing/orientation of each individual directional antenna of the switchable directional antenna assembly can be determined based on the information obtained from the GNSS signal.

Accordingly, the scanner system, for example the radio frequency receiver and/or the processing circuit, is configured to determine the position and/or bearing of the switched directional antenna assembly, for example the position and/or bearing of each individual directional antenna of the switched directional antenna assembly, by processing the GNSS signal received.

Consequently, the GNSS signal is indicative of the position and/or bearing of each individual directional antenna of the switched directional antenna assembly.

In general, the bearing corresponds to information of at least one angle, namely azimuth and/or elevation. It is known that the bearing can be determined in different ways, e.g. by a pseudo-Doppler technique, Watson-Watt technique or correlative interferometer.

The radio frequency receiver may have a first interface for the switchable directional antenna assembly and a second interface for the positioning antenna assembly. Hence, the respective antenna assemblies can be connected with the radio frequency receiver via the respective interfaces. For instance, the radio frequency receiver has dedicated connection ports that are used to connect the antenna assemblies, respectively.

In general, the radio frequency receiver receives the different information/data from the antenna assemblies connected, namely the radio frequency signal and the GNSS signal.

The radio frequency signal comprises information used for characterizing the mobile network, for example determining the respective performance, since the radio frequency signal is indicative of the characteristics of the mobile network.

Generally, the GNSS signal comprises information indicative of the position of the positioning antenna assembly receiving the GNSS signal, for example the scanner system that comprises several different components in defined geometrical relationship(s) such as the positioning antenna assembly.

In some embodiments, the GNSS signal may include information concerning latitude and/or longitude.

Moreover, the GNSS signal may also comprise a timing information such as a time stamp. Accordingly, the GNSS signal comprises information concerning latitude, longitude and/or time, e.g. timing information according to Coordinated Universal Time (UTC).

Since the radio frequency receiver and/or the processing circuit is configured to control the respective switch that is associated with the switchable directional antenna assembly for switching on/off the individual directional antennas of the switchable directional antenna assembly, the radio frequency receiver and/or the processing circuit also has information concerning the respective switching state of the switch. This information is indicative of the respective individual directional antenna(s) used during the respective measurement. Thus, the radio frequency receiver or rather the processing circuit is enabled to determine which of the individual directional antenna(s) of the switched directional antenna assembly contribute(s) to the signal that the radio frequency receiver receives from the switchable directional antenna assembly, based on which the respective baseband signal is generated. Put differently, it can be determined which of the individual directional antenna(s) of the switched directional antenna assembly contribute(s) to the respective baseband signal provided by the radio frequency receiver.

Hence, the different kind of information can be combined in order to process the data/information obtained from the switchable directional antenna assembly in an accurate manner.

The radio frequency receiver may be enabled to combine the respective information/data, namely the information of the switching state, the baseband signal obtained when processing the radio frequency signal, and, optionally, the information of the position and/or bearing due to the GNSS signal, thereby generating combined data that can be used for further processing. The respective combined data may relate to metadata, for example output metadata since the respective metadata is outputted. The respective output metadata may be forwarded to the processing circuit that processes the information in order to determine the angle of arrival, based on which the location of the base station emitting the radio frequency signal is estimated.

In some embodiments, the respective information/data obtained from different sources can be processed easily by the processing circuit, e.g. in a subsequent manner, which is connected with the radio frequency receiver. For instance, a standardized data format is outputted by the radio frequency receiver, wherein this data format ensures that the respective information/data is encompassed.

Generally, the GNSS data can be used to identify the position of the position antenna assembly, e.g. the scanner system or rather the individual components of the scanner system like the switchable directional antenna assembly, when performing the mobile network testing, wherein this information together with the knowledge of the directional antenna(s) switched on ensures that it can be determined in which direction the scanner system, for example the switched directional antenna assembly, is pointing, namely the direction of the active directional antenna(s).

The overall measurement time can be reduced since the number of measurements can be reduced compared to the prior art solutions.

In an embodiment, the radio frequency receiver is connected with the switchable directional antenna assembly, wherein the radio frequency receiver outputs the baseband signal, namely I/Q data. The baseband signal, namely the I/Q data, is forwarded to the processing circuit for further processing in order to determine the angle of arrival.

In some embodiments, the processing circuit may comprise a scanner and a demodulation circuit or module for processing the baseband signal, namely the I/Q data.

In some embodiments, the radio frequency receiver may have the additional connection port or rather interface for the positioning antenna assembly that is configured to receive the GNSS signal. The radio frequency receiver may additionally comprise a GNSS receiver that processes the GNSS signal in order to obtain the information encompassed in the GNSS signal, e.g. position information and timing information, namely information concerning latitude, longitude and/or time.

Further, the processing circuit may be configured to determine a power of the at least one radio frequency signal received by the respective directional antenna. Thus, a power measurement, namely a receive power measurement, is done in addition to the angle of arrival measurement. The (receive) power is obtained from the baseband signal, e.g. the I/Q data. The (receive) power may be used for determining or rather estimating the geographic location of the base station in a more accurate manner.

In some embodiments, the processing circuit is configured to determine the angle of arrival of the at least one radio frequency signal by comparing the respective powers of the at least two baseband signals associated with the different directional antennas. As mentioned above, the (receive) power is measured, wherein the (receive) powers associated with the two different baseband signals are obtained when performing the angle of arrival measurement. Thus, the angle of arrival can be determined by comparing the respective powers in order to identify which of the two different directional antennas is located closer to the base station that emits the radio frequency signal received. Again, the geometrical relationships of the directional antennas may be taken into account. In other words, since the power of at least two different measurements done by two different directional antennas are obtained, the respective powers may be put in relation to each other, thereby determining the angle of arrival in an accurate manner.

In some embodiments, the processing circuit is configured to process the baseband signal, thereby obtaining information concerning a cell identity, for example a physical cell identity, and/or a measurement time by using an internal clock. The processing circuit may perform analysis on the radio frequency signal measured in order to identify information concerning the base station emitting the radio frequency signal captured by the switchable directional antenna assembly, for instance the (physical) cell identity. For this purpose, the demodulation module may be used which demodulates the respective baseband signal.

For instance, the internal clock of the radio frequency scanner system is synchronized by the global navigation satellite system (GNSS) signal received via the positioning antenna assembly.

Further, the radio frequency scanner system may be configured to perform a time of arrival (ToA) measurement, wherein the processing circuit is configured to estimate the geographic location of the base station based on the angle of arrival of the at least one radio frequency signal as well as based on results obtained from the time of arrival measurement. The time of arrival measurement can be done by using the internal clock of the scanner system and/or by using the timing information obtained from the GNSS signal in case the scanner system comprises the positioning antenna assembly. In any case, the result of the time of arrival measurement as well as the result of the angle of arrival measurement both are used to estimate the geographic location in a more accurate manner compared to estimating the geographic location based on the angle of arrival solely.

Accordingly, the geographic location may be determined based on the result of the (receive) power measurement, the result of the time of arrival measurement and the result of the angle of arrival measurement. The different kinds of information may be analyzed together in order to estimate the geographic location of the base station in a most accurate manner compared to using only the angle of arrival measurement or rather the angle of arrival measurement together with one additional information, e.g. the (receive) power or the time of arrival. Thus, a precise estimation of the geographic location is possible.

For instance, the scanner system comprises two or more switchable directional antenna assemblies which are distributed in a scanning area. The processing circuit is configured to receive the baseband signals of the two or more switchable directional antenna assemblies in order to estimate the geographic location of the base station. Hence, the scanning area may be determined by the covered area of the respective switchable directional antenna assemblies that are located at fixed locations. Thus, the scanner system is at least partly a stationary scanner system due to the at least two switchable directional antenna assemblies located at fixed locations. The processing circuit has information concerning the respective locations of the switchable directional antenna assemblies as well as their respective orientations. Hence, the processing circuit is enabled to determine or rather estimate the geographic location of the base station based on the different baseband signals obtained from the different switchable directional antenna assemblies, for example their individual directional antennas used for capturing the radio frequency signal.

In some embodiments, the individual switchable directional antenna assemblies may be controlled in a similar manner, which means that the individual directional antenna(s) of each of the switchable directional antenna assemblies are/is switched on and/or off in a subsequent manner, thereby ensuring that baseband signals for each of the different directional antennas are obtained for each of the at least two switchable directional antenna assemblies. Thus, the information derived from these baseband signals can be used to determine the angle of arrival for each individual of the at least two switchable directional antenna assemblies. Generally, the geographic location of the base station can be estimated in a more accurate manner when using more than one directional antenna assembly at a fixed location.

According to another embodiment, the scanner system comprises a movable platform to which the switchable directional antenna assembly and the radio frequency receiver are connected such that mobile network testing can be performed at least partly while moving. The mobile network testing can be performed while moving within a certain area, thereby performing the respective network testing.

In some embodiments, the scanner system may comprise a handheld device that comprises the switchable directional antenna assembly and/or the radio frequency receiver. The handheld device may be used by an operator, e.g. for interference hunting. The radio frequency receiver may be integrated in the handheld device itself. Alternatively, the radio frequency receiver is put into a bag that is carried by the operator during mobile network testing. Thus, the handheld device (only) comprises the switchable directional antenna assembly. For instance, the handheld device may additionally comprise the optional positioning antenna assembly such that information concerning the bearing and/or position of the handheld device are gathered simultaneously.

In some embodiments, a time series of different measurements may be captured wherein the respective (receive) power for each individual measurement is taken into account in order to verify whether an operator using the radio frequency scanner system gets closer to the base station or not, which depends on an increasing power or rather a decreasing power when moving.

Further, the radio frequency scanner system may be configured to perform a Doppler shift measurement, wherein the processing circuit is configured to estimate the geographic location of the base station based on the angle of arrival of the at least one radio frequency signal as well as based on results obtained from the Doppler shift measurement. The Doppler shift measurement can be performed when the scanner system is moved at least partly, for example the switchable directional antenna assembly, such that a Doppler shift can be determined. The respective information of the Doppler shift may be used in addition to the angle of arrival measurement in order to estimate the geographic location of the base station in a more precise manner.

The Doppler shift measurement may also be performed in case the base station of the at least one radio frequency signal is a moving one, whereas the radio frequency scanner system, for example the at least one switchable directional antenna assembly, is an immobile or stationary one.

In some embodiments, the directional antennas may be Vivaldi antennas. The Vivaldi antennas are also called tapered slot antennas (TSA). Generally, this type of antenna relates to a co-planar broadband antenna that can be established in a very compact manner. In addition, Vivaldi antennas can be manufactured in a cost-efficient way, wherein Vivaldi antennas have broadband characteristics.

The switchable directional antenna assembly may be configured to be used as an omnidirectional antenna assembly. The switchable directional antenna assembly can be used or rather operated as the omnidirectional antenna assembly in case that all of the directional antennas are oriented such that they provide omnidirectional characteristics and, further, all of these directional antennas are switched on simultaneously.

In some embodiments, the scanner system may also comprise a local oscillator that is configured to provide a clock signal used for controlling the switch. It can be ensured that each of the individual directional antennas is switched on in a subsequent and defined manner based on the clock signal provided by the local oscillator. In some embodiments, each of the individual directional antennas is operated or rather switched on for a predetermined time that is equal for all of the individual directional antennas due to the clock signal.

In some embodiments, the scanner system may also comprise a storage medium. The storage medium may be associated with the radio frequency receiver and/or the processing circuit. The storage medium may be an internal storage medium or an external storage medium, namely a separately formed storage medium.

In some embodiments, the output metadata provided by the radio frequency receiver is stored in the storage medium.

In some embodiments, the scanner system comprises a magnetometer sensor that is configured to determine its orientation, thereby providing information of the bearing. Generally, the magnetometer sensor is configured to measure a magnetic field, a magnetic dipole moment, a direction, a strength, and/or a relative change of a magnetic field. The respective information sensed is used to determine the orientation of the magnetometer sensor itself, which in turn can be used to determine the orientation/bearing of any other component of the scanner system.

Again, the orientation/bearing of any other component of the scanner system can be determined due to the knowledge of the geometrical relationships of the respective component with respect to the magnetometer sensor.

Accordingly, it is sufficient that the positioning antenna assembly only provides information concerning the position, as the information concerning the bearing/orientation is obtained otherwise, namely by the magnetometer sensor. Accordingly, the positioning antenna assembly may be established in a less complex manner in case that the positioning antenna assembly only provides information concerning the position of the scanner system. Therefore, the costs of the radio frequency scanner system can be reduced further.

Thus, the scanner system, for example the radio frequency receiver, may be configured to determine the position of the switchable directional antenna assembly, for example the position of each individual directional antenna of the switchable directional antenna assembly, by processing the GNSS signal received. Hence, the GNSS signal is also indicative of the position of each individual directional antenna of the switchable directional antenna assembly.

In addition, the scanner system, for example the radio frequency receiver, may be configured to determine the bearing/orientation of the switchable directional antenna assembly, for example the bearing/orientation of each individual directional antenna of the switchable directional antenna assembly, by processing the GNSS signal received or the information gathered from the magnetometer sensor. Hence, the GNSS signal or rather the sensor signal of the magnetometer sensor is also indicative of the bearing/orientation of each individual directional antenna of the switchable directional antenna assembly.

In some embodiments, the radio frequency receiver may comprise a radio frequency chain. The radio frequency chain comprises components that are used for processing the at least one radio frequency signal received from the switchable directional antenna assembly. In some embodiments, the radio frequency chain comprises at least one down-converter, at least one amplifier, at least one filter and/or at least one analog-to-digital converter. The respective components are used for processing the analog radio frequency signal appropriately, thereby converting the analog radio frequency signal into the baseband signal, for example the I/Q components.

In some embodiments, the processing circuit may be implemented by a central processing unit (CPU), a graphical processing unit (GPU), an application-specific integrated circuit (ASIC) and/or a field-programmable gate array (FPGA).

The radio frequency receiver may simultaneously record the GNSS signal with positioning and/or bearing information, information regarding which directional antenna is ON, and the I/Q baseband data associated with the switchable directional antenna(s).

All the information simultaneously obtained may be combined by the radio frequency receiver, wherein the output metadata is generated. This metadata is passed to the separate processing circuit, for instance implemented in a laptop, tablet or a PC, for further processing, e.g. baseband processing, so as to determine the angle of arrival of the at least one radio frequency signal.

Due to the simultaneous processing of the different data/information, real-time processing is ensured. However, the combined information, namely the output metadata, may also be stored in the storage medium such that the further processing by the processing circuit can be done subsequently.

It is ensured that a mobile network testing can be performed with less efforts, as a less intensive drive route is required.

In general, the mobile network may correspond to a cellular network.

As discussed above, the geographic location of the base station can be estimated based on receive power, time of arrival (ToA) and angle of arrival (AoA) measurements in an accurate manner. Accordingly, the AoA measurement is additionally exploited such that more accurate estimates of the geographic location of the base station can be obtained, for example while simultaneously using a less intensive drive route in case of a mobile scanning.

Furthermore, small cells, e.g. cells for millimeter wave frequency bands like 5G NR FR2, can be localized by the radio frequency scanner system and the method.

In some embodiments, the scanner system is enabled to determine the receive power from one of the N directional antennas including the index of this directional antenna, the cell identity, the respective time of arrival of the signal, the geographic measurement position from the integrated GNSS receiver receiving the GNSS signal, the measurement time by the GNSS signals received and/or the internal clock as well as an antenna heading, e.g. the orientation and/or bearing of the switchable directional antenna assembly.

The processing circuit is enabled to determine the angle of arrival of the radio frequency signal, e.g. by comparing, for instance, the receive power from two up to all directional antennas of the switchable directional antenna assembly. Moreover, the processing circuit may align the ToA measurement according to the measurement time determined. Furthermore, the processing circuit may filter the measurement results over time in order to reduce any noise. In addition, measurement results associated with cells located on the same tower are merged.

Moreover, a confidence-interval or an error ellipse may be calculated, which means that an area is defined where a cell-location can be found with a specific probability.

Generally, the method of mobile network testing may be performed by using any embodiment of the scanner system set forth above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 6 schematically shows an overview of a method of mobile network testing by using a scanner system.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
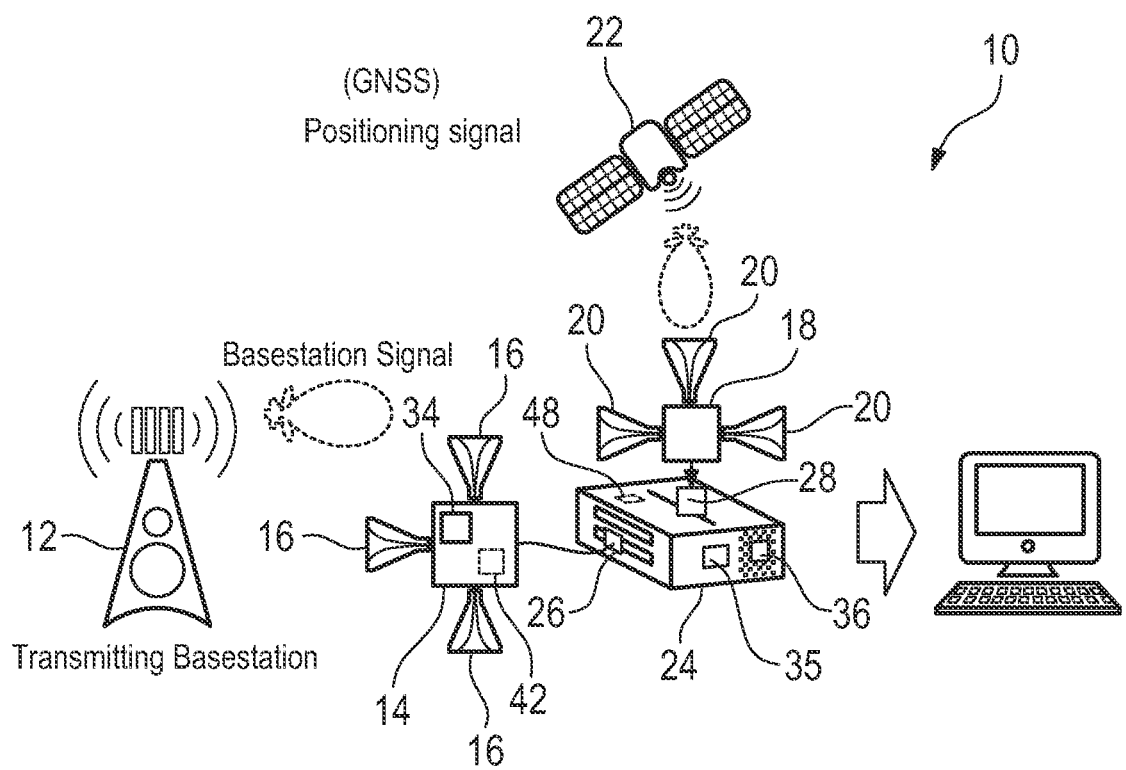
FIG. 1 schematically shows a radio frequency scanner system according to an embodiment of the present disclosure.

In FIG. 1, a radio frequency scanner system 10 is shown that is used for mobile network testing, e.g. testing a mobile network provided by a base station 12, also called transmitting base station, which emits a radio frequency signal, also called base station signal. Generally, the radio frequency scanner system 10 may be used to determine the performance of the mobile network or rather for interference hunting, namely identifying any source of interfering signals.

In the embodiment shown, the radio frequency scanner system 10 comprises a switchable directional antenna assembly 14, also called switched directional antenna assembly, which has several individual directional antennas 16, for example antennas of the type of Vivaldi, namely Vivaldi antennas, which are also called tapered slot antennas (TSA).

The several directional antennas 16 of the switchable directional antenna assembly 14 are oriented in different directions. In some embodiments, all of the respective directional antennas 16 are oriented in a certain direction that is different to the one of another antenna 16 of the switchable directional antenna assembly 14, thereby ensuring that each of the several directional antennas 16 is oriented towards a dedicated direction.

In the embodiment shown, the radio frequency scanner system 10 also comprises an optional positioning antenna assembly 18. The positioning antenna assembly 18 may comprise several positioning antennas 20. In general, the positioning antenna assembly 18 is configured to receive a global navigation satellite system (GNSS) signal, for instance a GPS, Beidou, Galileo, GLONASS or similar positioning signal. The respective GNSS signal may be emitted by a satellite 22 as indicated in FIG. 1.

The radio frequency scanner system 10 may further comprise a radio frequency receiver 24 that has a first interface 26 to which the switched directional antenna assembly 14 is connected as well as an optional second interface 28 to which the positioning antenna assembly 18 is connected. Accordingly, both antenna assemblies 14, 18 are connected with the radio frequency receiver 24 that receives the respective signals from the antenna assemblies 14, 18 accordingly.

The radio frequency receiver 24 receives the GNSS signal from the positioning antenna assembly 18 via the second interface 28, wherein the respective GNSS signal is indicative of the position and/or bearing/orientation, for example the position and/or bearing/orientation of the positioning antenna assembly 18.

The relative orientation of the positioning antenna assembly 18 with respect to the other components of the scanner system 10, for example the switched directional antenna assembly 14, e.g. each individual directional antenna 16, is known or predefined due to mechanical and/or geometrical relationships such that the radio frequency receiver 24 is enabled to determine the position and/or bearing of the other components of the scanner system 10 accordingly, for example the one of the switchable directional antenna assembly 14, preferably of each individual directional antenna 16.

Since the radio frequency receiver 24 is also connected with the switchable directional antenna assembly 14, the radio frequency receiver 24 also receives an analog radio frequency signal from the switchable directional antenna assembly 14 that corresponds to the base station signal emitted by the transmitting base station 12 that has been received by at least one of the several directional antennas 16 of the switched directional antenna assembly 14. The respective analog radio frequency signal received is internally processed by the radio frequency receiver 24 wherein the analog radio frequency signal is converted to a baseband signal for further processing.

Figure 2:
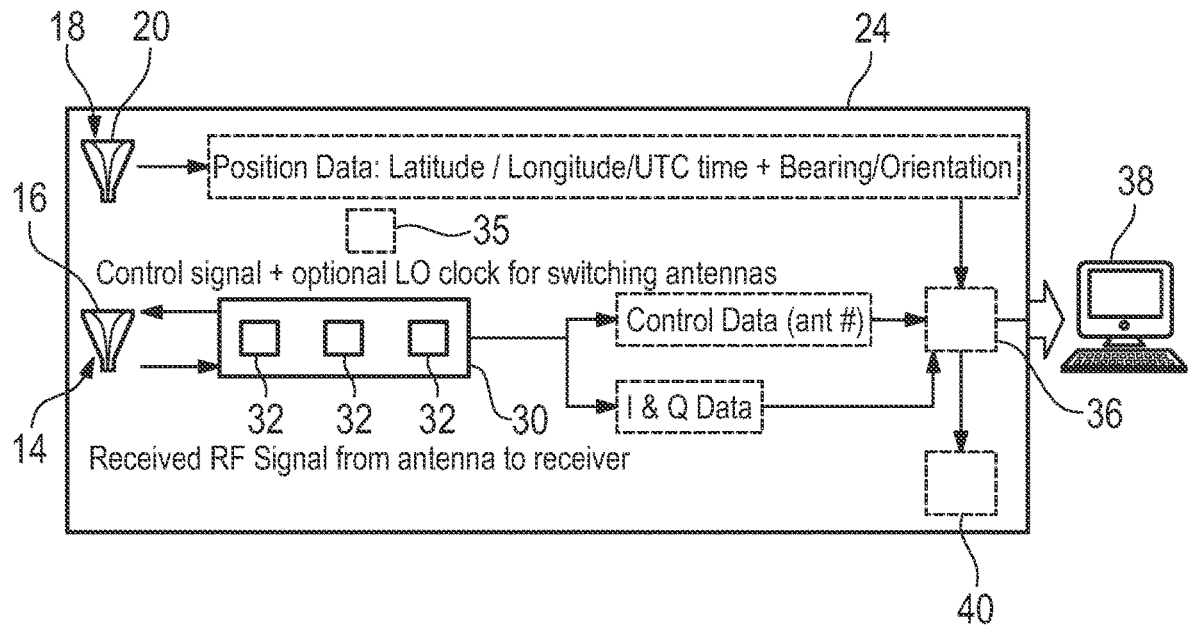
FIG. 2 schematically shows an overview illustrating data/information exchange within the radio frequency scanner system.
Figure 2:
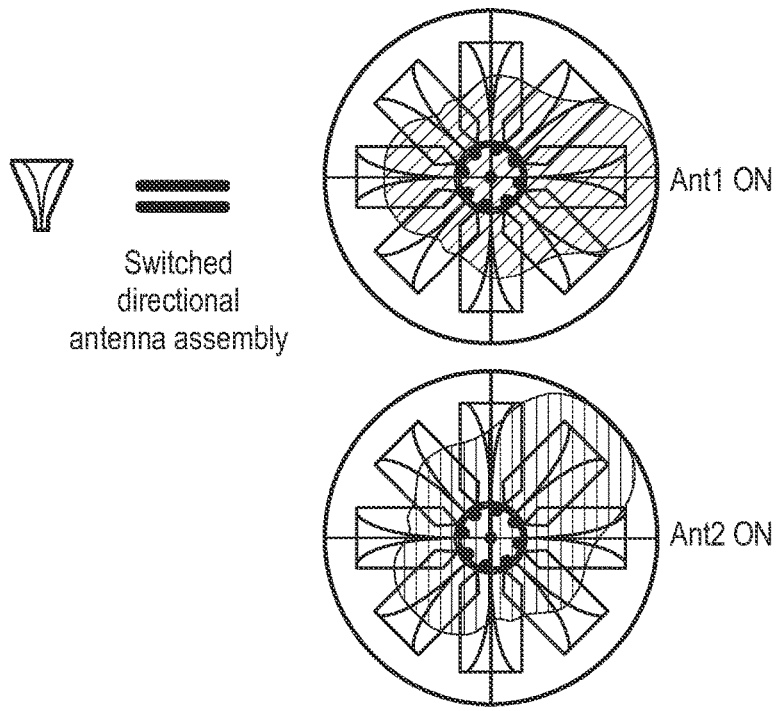

In FIG. 2, an overview is provided that illustrates the respective data/information exchange between the components of the scanner system 10 shown in FIG. 1, for example the antenna assemblies 14, 18 and the radio frequency receiver 24.

Thus, the radio frequency receiver 24 generally comprises a radio frequency chain 30 that has several components for processing the analog radio frequency signal. The respective components 32 may relate to a down-converter, an amplifier, a filter and/or an analog-to-digital converter. Generally, a down-converter may also be provided at the output of the radio frequency receiver 24.

The radio frequency receiver 24 is enabled to convert the analog radio frequency signal received from the switched directional antenna assembly 14 into a digital baseband signal, for example into I/Q components, by processing the analog radio frequency signal by the components 32 of the radio frequency chain 30.

The radio frequency scanner system 10 may also comprise at least one switch 34 that is controlled by the radio frequency receiver 24. The switch 34 may be integrated in the switched directional antenna assembly 14 as shown in FIG. 1, wherein the switch 34 has different switching states that define a certain one of the several directional antennas 16 to be switched on wherein the other directional antennas 16 are switched off. However, the respective switching may also include that a subset of the several directional antennas 16 are switched on, whereas the remaining ones are switched off.

Generally, the different switching states may comprise states in which only one individual directional antenna 16 of the several directional antennas 16 of the switchable directional antenna assembly 14 is switched on, whereas all other directional antennas 16 are switched off. However, further switching states may also comprise that more than one of the several directional antennas 16 are switched on simultaneously, thereby enlarging the beam width of the switchable directional antenna assembly 14 used for receiving the base station signal.

In a certain embodiment, all of the several directional antennas 16 may be switched on simultaneously, thereby ensuring that the switchable directional antenna assembly 14 is operated as an omnidirectional antenna.

The respective switch 34 is controlled by the radio frequency receiver 24 as also shown in FIG. 2 since the radio frequency receiver 24 forwards a respective control signal to the switch 34.

In some embodiments, the radio frequency scanner system 10 may comprise a local oscillator 35 that provides a local oscillator signal used as a clock signal for controlling the switch 34 appropriately. The local oscillator 35 may be integrated in the radio frequency receiver 24. In other words, the clock signal is used for switching the respective directional antennas 16 in a defined manner.

The radio frequency receiver 24 receives the respective information/data from the antenna assemblies 14, 18, namely the GNSS signal or rather information related thereto as well as the analog radio frequency signal associated with the base station signal of the transmitting base station 12. In addition, the radio frequency receiver 24 also has the information concerning the respective switching state of the switch 34 and, therefore, the respective directional antennas 16 of the switchable directional antenna assembly 14. Accordingly, the respective information concerning the switching state relates to control data provided by the radio frequency receiver 24 as indicated in FIG. 2.

In other words, the radio frequency receiver 24 has information concerning the position and bearing/orientation, the control data, namely the switching state, as well as the baseband, e.g. I/Q data. The radio frequency receiver 24 processes the different information/data obtained, for example by a data processing circuit 36, wherein the data/information is combined, and thereby generating output metadata as indicated in FIG. 2.

In some embodiments, the data processing circuit 36 can be implemented, for example, by a central processing unit (CPU), a graphical processing unit (GPU), an application-specific integrated circuit (ASIC) and/or a field-programmable gate array (FPGA).

The output metadata generated may be forwarded via an output interface to a separately formed processing circuit 38, for instance integrated in a computer or a laptop.

The processing circuit 38 is configured to receive the output metadata generated for further processing, wherein the processing circuit 38 may perform a baseband processing, namely a digital signal processing, or an analysis of the respective information/data contained in the output metadata, which will be described later in more detail.

In some embodiments, the separately formed processing circuit 38 may process the individual data/information contained in the output metadata separately or in a combined manner in order to gather further deeper insights of the combined data/information.

In some embodiments, the processing circuit 38 may also be realized by a central processing unit (CPU), a graphical processing unit (GPU), an application-specific integrated circuit (ASIC) and/or a field-programmable gate array (FPGA).

Generally, the processing circuit 38 may also be integrated within the radio frequency receiver 24. In other words, the data processing circuit 36 and the processing circuit 38 both may be implemented by the same circuit, which is also called processing circuit.

As also shown in FIG. 2, the respective control data may provide information concerning the respective orientation/bearing of the respective directional antenna 16 switched on, e.g. Ant1 or Ant2, during the respective measurement, thereby providing a deeper insight which improves the performance characterization of the network to be tested, as information is obtained in which direction the scanner system 10 is pointing, for example the switched directional antenna assembly 14.

The scanner system 10, for example the radio frequency receiver 24, may also comprise a storage medium 40 that can be used to store data/information received, for instance the output metadata generated by combining the different information/data or rather data/information gathered.

In the embodiment shown, the storage medium 40 is connected with the data processing circuit 36 that receives and processes all information/data gathered by the radio frequency receiver 24. However, the storage medium 40 may also be established by a separately component that is connected with the radio frequency receiver 24 and/or the processing circuit 38. For instance, the output metadata generated by the radio frequency receiver 24 may be stored in the storage medium 40 which is accessed by the processing circuit 38 subsequently in order to perform the respective analysis of the data stored.

In a certain embodiment, the scanner system 10 may have a magnetometer sensor 42 (illustrated in dashed lines in FIG. 1) that is configured to determine its orientation, thereby providing information of the bearing of the magnetometer sensor 42. The magnetometer sensor 42 may be associated with the switchable directional antenna assembly 14 such that information concerning the orientation of the switchable directional antenna assembly 14, for example each individual directional antenna 16, is provided by the magnetometer sensor 42.

However, the magnetometer sensor 42 may also be connected to the positioning antenna assembly 18 or rather any other component of the scanner system 10, as the relative orientations and/or connections between the individual components of the radio frequency scanner system 10 are known, thereby allowing to determine the relative orientation of each component of the radio frequency scanner system 10 accordingly.

Since the information concerning the bearing/orientation can be determined by the separately formed magnetometer sensor 42, it is not necessary to obtain the respective kind of information from the GNSS signal that is received by the positioning antenna assembly 18. In other words, the GNSS signal is only processed to obtain the position data, e.g. latitude, longitude and/or timing information such as UTC time.

Figure 3A:
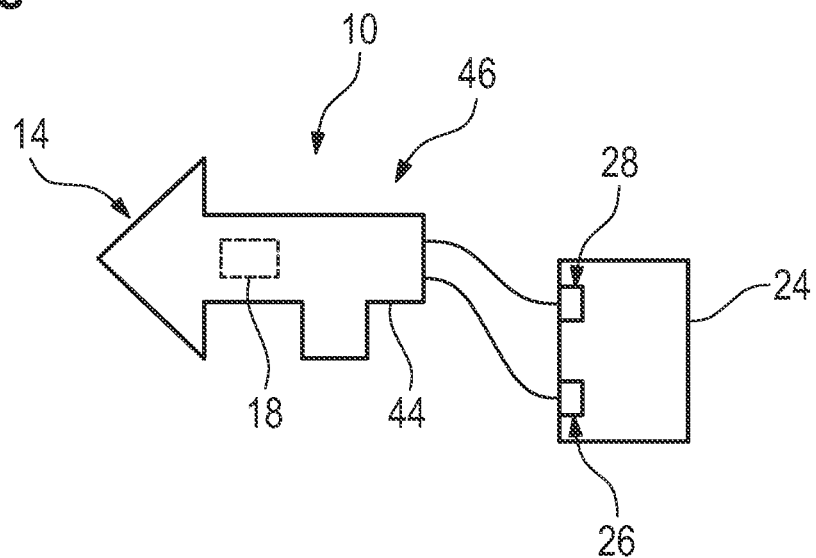
FIGS. 3A and 3B schematically show two specific embodiments of the radio frequency scanner system according to the present disclosure.

In FIG. 3A, a certain embodiment of the radio frequency scanner system 10 is shown, as the scanner system 10 comprises a handheld device 44 that can be carried by an operator of the radio frequency scanner system 10, for example for interference hunting.

In the handheld device 44, at least one of the antenna assemblies 14, 18, for example the switchable directional antenna assembly 14 with the several directional antennas 16 is integrated. However, the handheld device 44 may also comprise the positioning antenna assembly 18 with the antennas 20.

In a certain embodiment, the handheld device 44 may also comprise the radio frequency receiver 24. Alternatively, the radio frequency receiver 24 is provided separately, wherein the handheld device 44 is connected with the respective interfaces 26, 28 of the radio frequency receiver 24. The radio frequency receiver 24 may be carried by the operator, for instance in a backpack.

Accordingly, the radio frequency scanner system 10 has a movable platform 46, as the handheld device 44 corresponds to the movable platform 46 that carries respective components of the scanner system 10.

Therefore, mobile network testing can be performed while moving, for instance walking in a field.

Figure 3B:
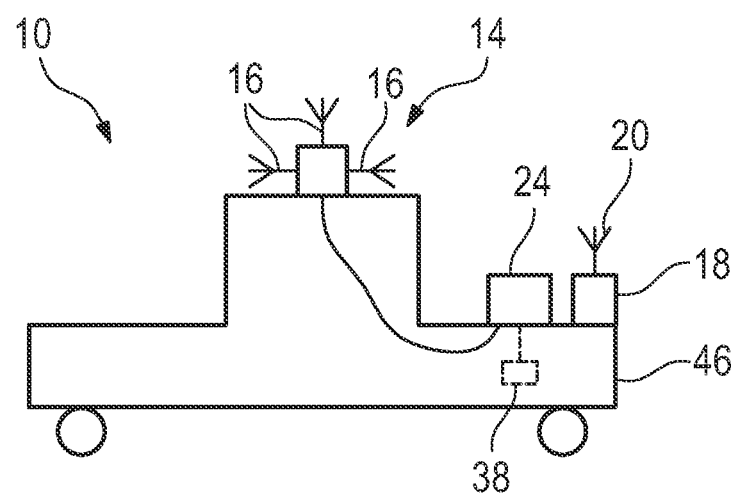

In FIG. 3B, an alternative embodiment of the scanner system 10 is shown, as the scanner system 10 comprises a motorized movable platform 46 like a vehicle. As shown in FIG. 3B, the switchable directional antenna assembly 14, the radio frequency receiver 24 and the positioning antenna assembly 18 all are mounted on the motorized movable platform 46 such that mobile network testing can be performed while moving in the field, for example driving.

The processing circuit 38 may also be provided on the (motorized) movable platform 46 which ensures real-time processing of the data captured during the network testing. Additionally or alternatively, the storage medium 40 may be provided on the (motorized) movable platform 46 such that the data gathered may be stored for being accessed later by the processing circuit 38 in order to analyze the data gathered.

Generally, the analysis of the data captured/gathered includes determining an angle of arrival (AoA) of the at least one radio frequency signal with respect to the at least one switchable directional antenna assembly 14.

For this purpose, the processing circuit 38 processes at least two different baseband signals, e.g. the I/Q data obtained, which are associated with two different directional antennas 16 of the switchable directional antenna assembly 14.

As mentioned above, the switch 34 is controlled such that two different directional antennas 16 capture the radio frequency signal. Hence, two different signals associated with the different directional antennas 16 selected are processed by the radio frequency receiver 24 that generates different baseband signals which are associated with the respective directional antenna 16 selected.

In some embodiments, the processing circuit 38 analyzes the baseband signals, namely the I/Q data, wherein a (receive) power of the at least one radio frequency signal received by the respective directional antenna 16 is determined. Based on the (receive) powers of the different baseband signals associated with the different directional antennas 16, the angle of arrival can be determined in an efficient manner. In some embodiments, the respective powers of the at least two baseband signals associated with the different directional antennas 16 are compared, thereby identifying which of the at least two different directional antennas 16 receives the radio frequency signal with a higher power. Thus, the directional antenna 16 providing the higher power may be oriented closer to the other directional antenna 16 such that the angle of arrival can be determined. When determining the angle of arrival of the at least one radio frequency signal, the processing circuit 38 also processes the information of the switching state of the switch 34 which may be included in the metadata received from the radio frequency receiver 24. Alternatively, the information of the switching state of the switch 34 is forwarded to the processing circuit 38 in a separate manner.

Based on the angle of arrival determined, the processing circuit 38 is enabled to estimate the location of the base station 12.

To improve the accuracy of the estimation, the processing circuit 38 may additionally take the (receive) power into account. Hence, the angle of arrival measurement as well as the power measurement may be used in order to estimate the geographic location of the base station 12.

The estimation may be further improved with regard to the accuracy by additionally performing the time of arrival (ToA) measurement. For this purpose, an internal clock 48 (as indicated in FIG. 1) and/or the GNSS signal, for example the timing information, may be used in order to determine the time of arrival of the radio frequency signal received by the respective directional antenna 16 of the switchable directional antenna assembly 14.

Accordingly, the processing circuit 38 may analyze or perform the angle of arrival measurement, the power measurement as well as the time of arrival measurement in order to estimate the geographic location of the base station 12.

Figure 4:
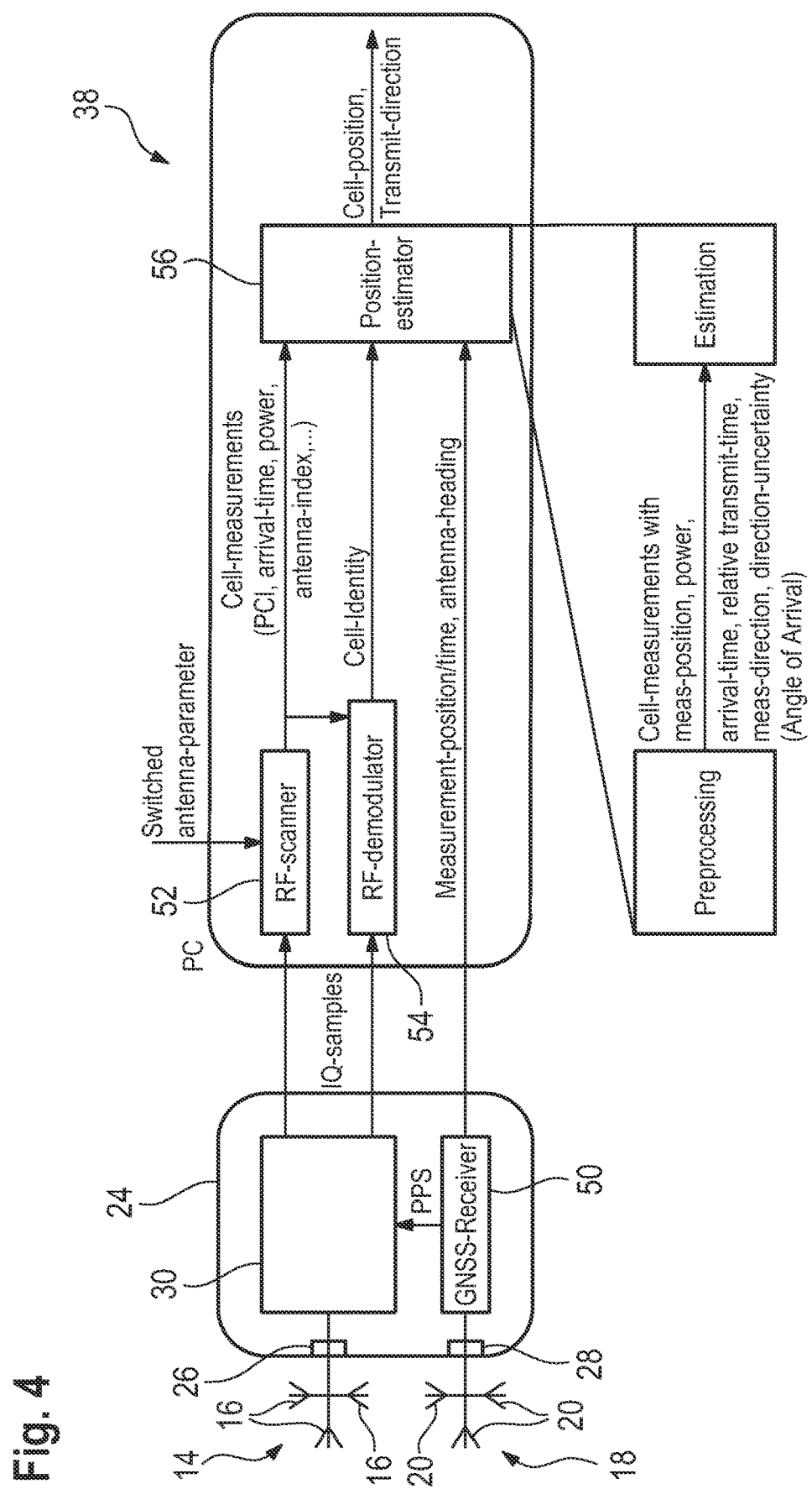
FIG. 4 schematically shows a radio frequency scanner system according to another embodiment of the present disclosure.

In FIG. 4, another schematic overview of the radio frequency scanner system 10 is shown, which illustrates the processing done by the processing circuit 38 in more detail.

As illustrated in FIG. 4, the radio frequency receiver 24 comprises a GNSS receiver 50 that processes the GNSS signal(s) received by the positioning antenna assembly 18. The GNSS receiver 50 forwards pulse per second (PPS) signals to the radio frequency chain 30 of the radio frequency receiver 24 that processes the radio frequency signal received via the switchable directional antenna assembly 14.

The radio frequency receiver 24 outputs the baseband signals, namely the I/Q samples, together with information encompassed in the GNSS signal, wherein the subsequent processing circuit 38 processes the respective information obtained.

In the embodiment shown, the processing circuit 38 directly receives the information concerning the switch state of the switch 34, namely the switched antenna parameter. Alternatively, this information may be included in the data obtained from the radio frequency receiver 24.

In any case, the processing circuit 38 comprises an RF scanner 52 as well as an RF demodulation circuit or module 54, also called RF-demodulator, which process the baseband signals, namely the I/Q data, in order to obtain information encompassed in the radio frequency signal such as the power, the cell identity, for example the physical cell identity, and/or a measurement time by using the internal clock 48.

The RF scanner 52 also processes the information concerning the switch state of the switch 34 such that the antenna-index of the directional antenna 16 used can be determined.

The processing circuit 38 further processes the information encompassed in the GNSS signal in order to determine the position/time of the respective measurement performed as well as a bearing/orientation of the respective directional antenna 16 used for performing the measurement.

Hence, the processing circuit 38 is enabled to put the different information into relation to each other such that the geographic location of the base station 12 can be determined, e.g. by a position estimator module 56 that is part of the processing circuit 38.

The processing circuit 38, for example its position estimator module 56, determines the angle of arrival of the radio frequency signal. For this purpose, the processing circuit 38, for example its position estimator module 56, may combine the measurement results from the RF scanner 52 and the RF demodulation module 54 with the information obtained from the GNSS signal as shown in FIG. 4.

In some embodiments, the receive power, the time of arrival as well as the angle of arrival may be taken into account by the processing circuit 38 in order to estimate the geographic location of the base station 12, namely the cell position.

In case of a mobile scanner system 10 or at least a scanner system 10 having a mobile platform 46, the radio frequency scanner system 10 is configured to perform a Doppler shift measurement.

Hence, the processing circuit 38 may estimate the geographic location of the base station 12 based on the angle of arrival of the at least one radio frequency signal as well as based on the result obtained from the Doppler shift measurement. The Doppler shift measurement can be performed when the scanner system 10 is moved at least partly, for example the switchable directional antenna assembly 14, such that a Doppler shift can be determined. The respective information of the Doppler shift may be used in addition to the angle of arrival measurement in order to estimate the geographic location of the base station 12 in a more precise manner.

Figure 5:
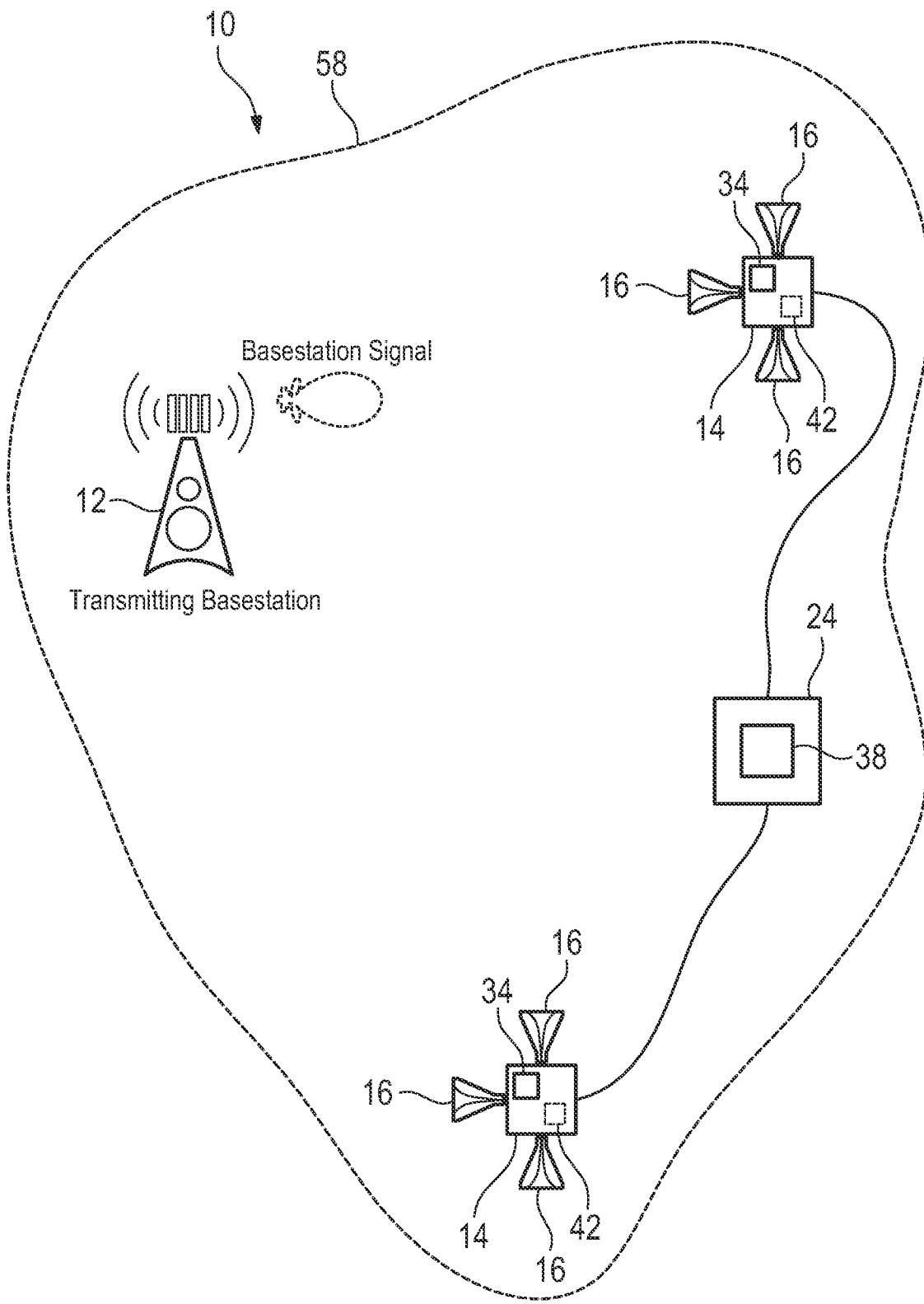
FIG. 5 schematically shows an overview of a radio frequency scanner system according to a further embodiment of the present disclosure.

In FIG. 5, another embodiment of the radio frequency scanner system 10 is shown, wherein two switchable directional antenna assemblies 14 are provided that are located at fixed locations. Hence, the switchable directional antenna assemblies 14 are stationary assemblies that are not moved during the mobile network testing.

Accordingly, the radio frequency scanner system 10 can be used to monitor a certain scanning area 58 within which the switchable directional antenna assemblies 14 are distributed.

The switchable directional antenna assemblies 14 are connected with a single radio frequency receiver 24 that comprises the processing circuit 38 in the shown embodiment. Alternatively, the processing circuit 38 may be established in a separate manner. Furthermore, each switchable directional antenna assembly 14 may be connected with a dedicated radio frequency receiver 24 such that the number of switchable directional antenna assemblies 14 corresponds to the number of radio frequency receivers 24. However, the several radio frequency receivers 24 may be connected with a single processing circuit 38 that receives the different baseband signals from the several radio frequency receivers 24.

Generally, the scanner system 10 is enabled to perform a method of mobile network testing, an example of which is illustrated in FIG. 6.

Accordingly, a first of several directional antennas 16 of a switchable directional antenna assembly 14 is selected by the switch 34 such that the radio frequency signal, e.g. the base station signal, is received by the first directional antenna 16 of the switchable directional antenna assembly 14, which has been selected previously. Then, the radio frequency receiver 24 processes the radio frequency signal received by the first directional antenna 16, thereby converting the respective signal into a first baseband signal, e.g. I/Q data, for further processing.

Then, the switch 34 is controlled to select a second of the several directional antennas 16 of the switchable directional antenna assembly 14 which also receives the RF signal that is processed by the radio frequency receiver 24 in a similar manner while providing the second baseband signal, e.g. I/Q data indicative of the second directional antenna 16 selected previously.

The baseband signals associated with the respective directional antennas 16 are forwarded to the processing circuit 38 that processes the data accordingly, thereby determining the angle of arrival of the at least one radio frequency signal with respect to the at least one switchable directional antenna assembly 14.

Based on the angle of arrival, the geographic location of the base station 12 emitting the radio frequency signal is estimated.

To improve the accuracy of the estimation, a time of arrival (ToA) measurement, a Doppler shift measurement and/or a power measurement of the at least one radio frequency signal are/is performed additionally. Hence, the geographic location of the base station 12 is estimated based on a combination of the respective data/information, e.g. the angle of arrival determined together with the result(s) of the time of arrival (ToA) measurement, the Doppler shift measurement and/or the power measurement.

Furthermore, a GNSS signal, e.g. the information encompassed in the GNSS signal, may be used in order to determine the orientation/bearing of the switchable directional antenna assembly 14 such that the angle of arrival can be determined easily. Moreover, timing information may be obtained from the GNSS signal.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A radio frequency scanner system for mobile network testing, the scanner system comprising at least one switchable directional antenna assembly, a radio frequency receiver, and a processing circuit,
   wherein the at least one switchable directional antenna assembly comprises several directional antennas oriented in different directions, wherein the directional antennas of the at least one switchable directional antenna assembly are connected to at least one switch that is controlled by the radio frequency receiver, and wherein the directional antennas are configured to receive at least one radio frequency signal,
   wherein the radio frequency receiver is connected with the switchable directional antenna assembly,
   wherein the radio frequency receiver is configured to process the at least one radio frequency signal received by the switchable directional antenna assembly, thereby converting the at least one radio frequency signal to a baseband signal,
   wherein the processing circuit is configured to process at least two baseband signals associated with two different directional antennas in order to determine an angle of arrival (AoA) of the at least one radio frequency signal with respect to the at least one switchable directional antenna assembly, and wherein the processing circuit is configured to estimate a geographic location of a base station emitting the at least one radio frequency signal based on the angle of arrival of the at least one radio frequency signal.

2. The radio frequency scanner system according to claim 1, wherein the baseband signal is a digital baseband signal and/or comprises in-phase and quadrature components.

3. The radio frequency scanner system according to claim 1, wherein the processing circuit is configured to process information of a switching state of the switch when determining the angle of arrival of the at least one radio frequency signal.

4. The radio frequency scanner system according to claim 1, wherein the radio frequency scanner system comprises a positioning antenna assembly configured to receive a Global Navigation Satellite System (GNSS) signal, wherein the positioning antenna assembly is located in defined relation with respect to the switchable directional antenna assembly, and wherein the processing circuit is configured to receive and process the GNSS signal from the positioning antenna assembly, which is indicative of the position and/or bearing of the switchable directional antenna assembly such that the processing circuit is configured to gather information of the position and/or bearing of the switchable directional antenna assembly.

5. The radio frequency scanner system according to claim 1, wherein the processing circuit is configured to determine a power of the at least one radio frequency signal received by the respective directional antenna.

6. The radio frequency scanner system according to claim 5, wherein the processing circuit is configured to determine the angle of arrival of the at least one radio frequency signal by comparing the respective powers of the at least two baseband signals associated with the different directional antennas.

7. The radio frequency scanner system according to claim 1, wherein the processing circuit is configured to process the baseband signal, thereby obtaining information concerning a cell identity and/or a measurement time by using an internal clock.

8. The radio frequency scanner system according to claim 7, wherein the information concerning a cell identity is a physical cell identity.

9. The radio frequency scanner system according to claim 1, wherein the radio frequency scanner system is configured to perform a time of arrival (ToA) measurement, and wherein the processing circuit is configured to estimate the geographic location of the base station based on the angle of arrival of the at least one radio frequency signal as well as based on results obtained from the time of arrival measurement.

10. The radio frequency scanner system according to claim 1, wherein the scanner system comprises two or more switchable directional antenna assemblies which are distributed in a scanning area, and wherein the processing circuit is configured to receive the baseband signals of the two or more switchable directional antenna assemblies in order to estimate the geographic location of the base station.

11. The radio frequency scanner system according to claim 1, wherein the scanner system comprises a movable platform to which the switchable directional antenna assembly, the radio frequency receiver and the positioning antenna assembly are connected such that mobile network testing can be performed while moving.

12. The radio frequency scanner system according to claim 1, wherein the scanner system comprises a handheld device that comprises the switchable directional antenna assembly and/or the radio frequency receiver.

13. The radio frequency scanner system according to claim 1, wherein the radio frequency scanner system is configured to perform a Doppler shift measurement, wherein the processing circuit is configured to estimate the geographic location of the base station based on the angle of arrival of the at least one radio frequency signal as well as based on results obtained from the Doppler shift measurement.

14. A method of mobile network testing by using a scanner system, wherein the method comprises the steps of:
   selecting, by a switch, a first of several directional antennas of a switchable directional antenna assembly;
   receiving a radio frequency signal by the first directional antenna of the switchable directional antenna assembly;
   processing the radio frequency signal by a radio frequency receiver, thereby converting the radio frequency signal to a first baseband signal associated with the first directional antenna;

selecting, by the switch, a second of the several directional antennas of the switchable directional antenna assembly;

receiving the radio frequency signal by the second directional antenna of the switchable directional antenna assembly;

processing the radio frequency signal by the radio frequency receiver, thereby converting the radio frequency signal to a second baseband signal associated with the second directional antenna;

forwarding the first baseband signal and the second baseband signal to a processing circuit;

processing, by the processing circuit, the first baseband signal and the second baseband signal in order to determine an angle of arrival (AoA) of the at least one radio frequency signal with respect to the at least one switchable directional antenna assembly; and estimating, by the processing circuit, a geographic location of a base station emitting the at least one radio frequency signal based on the angle of arrival of the at least one radio frequency signal.

15. The method according to claim 14, wherein a Global Navigation Satellite System (GNSS) signal is received by a positioning antenna assembly which is located in defined relation with respect to the switchable directional antenna assembly, wherein the GNSS signal from the positioning antenna assembly is processed by the processing circuit, which is indicative of the position and/or bearing of the switchable directional antenna assembly such that information of the position and/or bearing of the switchable directional antenna assembly is gathered.

16. The method according to claim 14, wherein a time of arrival (ToA) measurement, a Doppler shift measurement and/or a power measurement of the at least one radio frequency signal are/is performed, based on which together with the angle of arrival determined the geographic location of the base station is estimated.

\* \* \* \* \*